(12) United States Patent
Tanaka et al.

(10) Patent No.: US 9,010,508 B2
(45) Date of Patent: Apr. 21, 2015

(54) STARTING APPARATUS

(75) Inventors: Junji Tanaka, Anjo (JP); Yuito Abe, Okazaki (JP); Kazuyoshi Ito, Tsushima (JP); Koji Maeda, Anjo (JP); Naohisa Momiyama, Hekinan (JP)

(73) Assignee: Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 13/983,499

(22) PCT Filed: Feb. 29, 2012

(86) PCT No.: PCT/JP2012/055138
§ 371 (c)(1),
(2), (4) Date: Aug. 2, 2013

(87) PCT Pub. No.: WO2012/132739
PCT Pub. Date: Oct. 4, 2012

(65) Prior Publication Data
US 2013/0306426 A1    Nov. 21, 2013

(30) Foreign Application Priority Data
Mar. 31, 2011 (JP) ................................. 2011-080207

(51) Int. Cl.
*F16D 25/0635* (2006.01)
*F16H 45/02* (2006.01)

(52) U.S. Cl.
CPC ............ *F16D 25/0635* (2013.01); *F16H 45/02* (2013.01); *F16H 2045/0205* (2013.01); *F16H 2045/0284* (2013.01); *F16H 2045/0226* (2013.01)

(58) Field of Classification Search
None
See application file for complete search history.

(56) References Cited

U.S. PATENT DOCUMENTS

| 5,695,032 A * | 12/1997 | Murata et al. ................ 192/48.1 |
| 6,508,346 B1 * | 1/2003 | Simpson ........................ 192/3.3 |
| 2005/0115788 A1 * | 6/2005 | Ackermann et al. ......... 192/3.29 |
| 2008/0277222 A1 | 11/2008 | Olsen et al. |
| 2009/0120754 A1 | 5/2009 | Degler et al. |
| 2009/0157272 A1 | 6/2009 | Uhler et al. |
| 2009/0242348 A1 | 10/2009 | Ishikawa et al. |
| 2010/0178102 A1 | 7/2010 | Brehmer et al. |

FOREIGN PATENT DOCUMENTS

| DE | 10 2007 028 258 A1 | 12/2008 |
| DE | 10 2008 060 940 A1 | 6/2010 |

(Continued)

OTHER PUBLICATIONS

International Search Report issued in International Patent Application No. PCT/JP2012/055138 mailed May 22, 2012.

*Primary Examiner* — Ramya Burgess
*Assistant Examiner* — Mark Manley
(74) *Attorney, Agent, or Firm* — Oliff PLC

(57) ABSTRACT

In a hydraulic transmission apparatus, a lockup piston of a lockup clutch mechanism is placed on the opposite side of first and second friction plates from a sidewall portion of a front cover. A damper device is placed on the opposite side of the lockup piston from the first and second friction plates. An outer peripheral portion of the lockup piston is located closer to the outer periphery than an outer peripheral portion of a flange member. A part of the lockup piston is placed in a region located between first and second springs and a third spring of the damper device in a radial direction and in the range of an axial width of the third spring located closer to the lockup piston.

8 Claims, 3 Drawing Sheets

(56) References Cited

FOREIGN PATENT DOCUMENTS

| JP | A-2008-286394 | 11/2008 |
| JP | A-2009-515116 | 4/2009 |
| JP | A-2009-150548 | 7/2009 |
| JP | A-2009-243597 | 10/2009 |
| JP | A-2010-216499 | 9/2010 |

* cited by examiner

STARTING APPARATUS

INCORPORATION BY REFERENCE

The disclosure of Japanese Patent Application No. 2011-080207 filed on Mar. 31, 2011 including the specification, drawings and abstract is incorporated herein by reference in its entirety

BACKGROUND OF THE INVENTION

The present invention relates to starting apparatuses that include a clutch capable of transmitting power input to an input member to an input shaft of a transmission apparatus and capable of cutting off the power transmission between the input member and the input shaft.

DESCRIPTION OF THE RELATED ART

Conventionally, as clutches included in this type of starting apparatus, such clutches are known that include: a friction plate support member coupled to a front cover as an input member via a damper device and supporting a plurality of friction plates (friction plates); a second friction plate support member supported by a turbine hub and supporting a plurality of friction plates (separator plates); a piston moving in the axial direction with respect to the input member to press the plurality of friction plates; and a member fixed to the turbine hub and defining an oil chamber behind the piston (on the front cover side) (see, e.g., Japanese Patent Application Publication No. 2009-150548 (JP 2009-150548 A)).

As starting apparatuses including a multi-plate clutch, such starting apparatuses are known that include: a piston capable of rotating together with an input member (front cover) and moving in the axial direction toward the input member to press a plurality of friction plates; an annular oil-chamber defining member placed behind the piston, namely on the opposite side of the piston from the input member, and together with the piston, defining an engagement-side oil chamber to which hydraulic oil is supplied; and a damper placed behind the oil-chamber defining member, namely on the opposite side of the oil-chamber defining member from the input member (see, e.g., German Patent Application Publication No. 102008060940 (DE 102008060940 A)).

SUMMARY OF THE INVENTION

In the conventional clutch devices, the second friction plate support member and the piston are supported by the turbine hub, and the member defining the oil chamber on the front cover side of the piston is placed between the piston and the front cover, whereby the axial length is increased. In the conventional starting apparatuses, the oil-chamber defining member is placed between the piston and the damper, whereby the axial length is increased.

It is a primary object of the present invention to reduce the axial length of a starting apparatus including a multi-plate clutch and a damper.

A starting apparatus of the present invention employs the following means in order to achieve the primary object.

A starting apparatus according to an aspect of the present invention is a starting apparatus including: a clutch capable of transmitting power input to an input member to an input shaft of a transmission apparatus and capable of cutting off the power transmission between the input member and the input shaft; and a damper having an outer peripheral-side spring and an inner peripheral-side spring. In the starting apparatus, the clutch includes a first friction plate that is fitted in a clutch hub fixed to the input member, a second friction plate that is fitted in a clutch drum coupled to the input shaft of the transmission apparatus, a piston that is placed on an opposite side of the first and second friction plates from the input member and is capable of moving in an axial direction of the starting apparatus toward the input member to press the first and second friction plates, and an oil-chamber defining member that together with the piston defines an engagement-side oil chamber to which hydraulic oil is supplied, the damper is placed on an opposite side of the piston from the first and second friction plates, a pressing portion of the piston is located closer to an outer periphery of the starting apparatus than an outer peripheral portion of the oil-chamber defining member is, and the pressing portion of the piston is placed in a region located between the outer peripheral-side spring and the inner peripheral-side spring in a radial direction of the starting apparatus and in a range of an axial width of one of the outer peripheral-side spring and the inner peripheral-side spring.

In this starting apparatus, the piston of the clutch is placed on the opposite side of the first and second friction plates from the input member, and the damper is placed on the opposite side of the piston from the first and second friction plates. The pressing portion of the piston is located closer to the outer periphery than the outer peripheral portion of the oil-chamber defining member is, and (a part of) the pressing portion of the piston is placed in the region located between the outer peripheral-side spring and the inner peripheral-side spring of the damper in the radial direction and in the range of the axial width of one of the outer peripheral-side spring and the inner peripheral-side spring. The oil-chamber defining member is thus placed radially inward of the piston, and a part of the piston is located between the outer peripheral-side spring and the inner peripheral-side spring of the damper in the radial direction. This allows the piston, the oil-chamber defining member, and the damper to be arranged closer to each other in the axial direction, whereby torque vibrations can be effectively absorbed, and torque capacity can be increased. Moreover, for example, increasing a slip region in a multi-plate clutch allows torque variations to be more effectively absorbed, and allows the axial length of the starting apparatus including the multi-plate clutch and the damper to be reduced.

The input member may include a first support portion that slidably supports an inner peripheral portion of the piston, and a second support portion which is formed closer to an inner periphery of the starting apparatus than the first support portion is, and on which an inner peripheral portion of the oil-chamber defining member that is fixed in the axial direction is fitted. This allows the input member, the piston, and the oil-chamber defining member to be arranged closer to each other in the axial direction, whereby the axial length of the starting apparatus can be reduced.

The first support portion and the oil-chamber defining member fitted on the second support portion may overlap each other as viewed in the radial direction. This can further reduce the axial length of the starting apparatus.

The input member and the piston may define, on an inner peripheral side of the first and second friction plates, a lubricant passage that supplies the hydraulic oil to the first and second friction plates. Thus, if a sufficient amount of hydraulic oil is supplied to the first and second friction plates via the lubricant passage when the clutch is disengaged, the first and second friction plates that have been pressed together can be quickly separated from each other. Accordingly, a return spring can be omitted, and the axial length of the starting apparatus can be reduced.

The oil-chamber defining member may have a piston movement restricting portion that contacts the piston to restrict movement of the piston in a direction away from the first and second friction plates. This eliminates the need to separately use a member that restricts the movement of the piston in the direction away from the first and second friction plates, whereby the axial length of the starting apparatus can further be reduced.

An oil passage that opens in the axial direction to the engagement-side oil chamber may be formed in the input member. This can reduce the axial length of the engagement-side oil chamber, whereby the axial length of the starting apparatus can further be reduced.

The input member may have a protruding portion that is formed so as to protrude in the axial direction toward the piston, and that contacts one of the first and second friction plates. Thus, a so-called backing plate (end plate) can be omitted, whereby the axial length of the starting apparatus can further be reduced.

The starting apparatus may further include: a pump impeller; and a turbine runner, and the input member may be a front cover that is bonded to a pump shell of the pump impeller, and that together with the pump shell forms a hydraulic transmission chamber.

DETAILED DESCRIPTION OF THE EMBODIMENTS

A mode for carrying out the present invention will be described below by using an embodiment.

Figure 1:
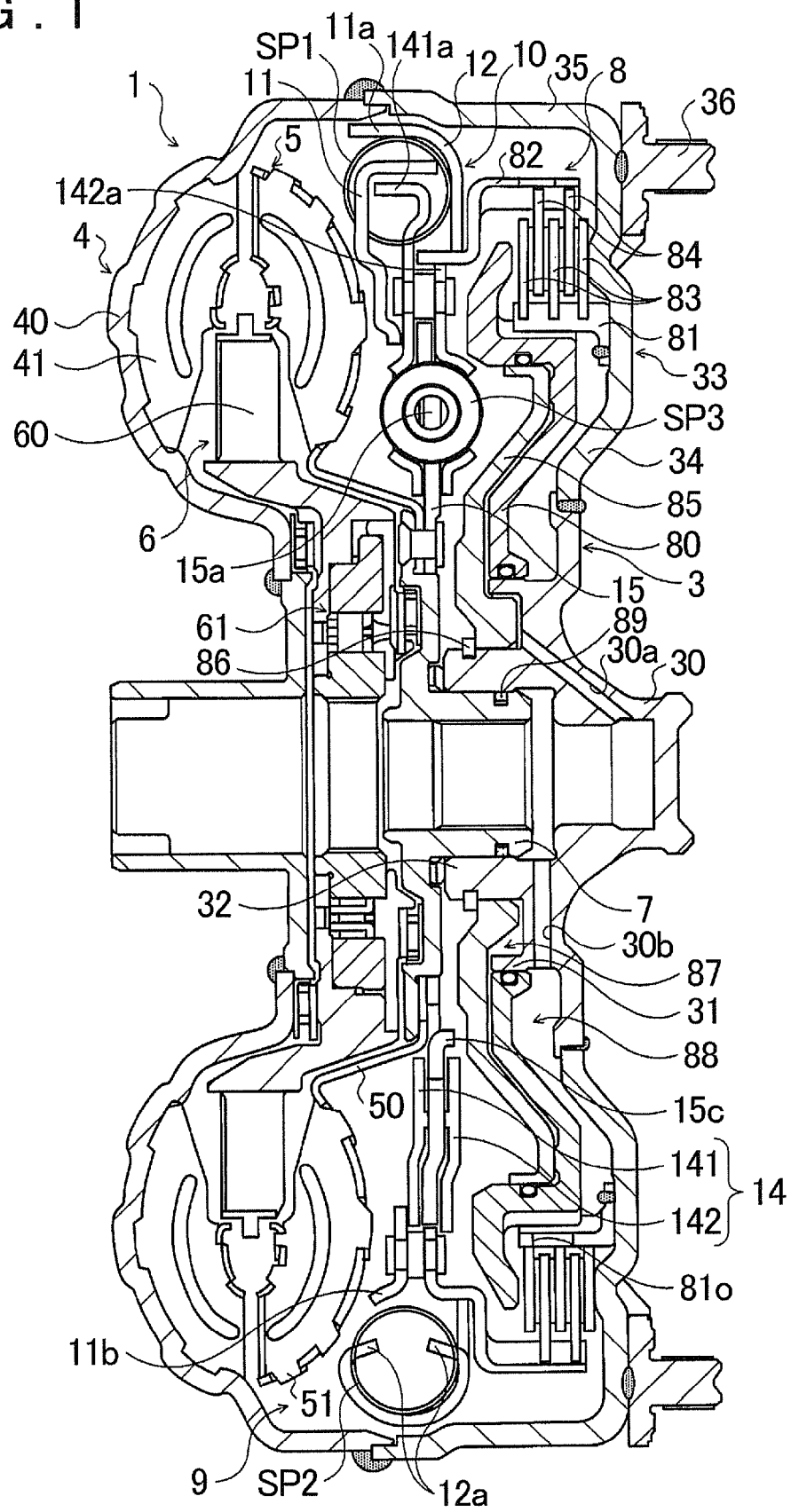
FIG. 1 is a partial sectional view showing a hydraulic transmission apparatus 1 as a starting apparatus according to an embodiment of the present invention.

FIG. 1 is a configuration diagram showing a hydraulic transmission apparatus 1 as a starting apparatus according to an embodiment of the present invention. The hydraulic transmission apparatus 1 shown in the figure is a torque converter that is mounted as a starting apparatus on a vehicle including an engine (internal combustion engine) as a motor, and includes: a front cover (input member) 3 that is coupled to a crankshaft of the engine, not shown; a pump impeller (input-side hydraulic transmission element) 4 fixed to the front cover 3; a turbine runner (output-side hydraulic transmission element) 5 capable of rotating coaxially with the pump impeller 4; a stator 6 that adjusts the flow of hydraulic oil (working fluid) from the turbine runner 5 to the pump impeller 4; a turbine hub (output member) 7 that is fixed to an input shaft of a transmission apparatus as an automatic transmission (AT) or a continuously variable transmission (CVT), not shown; a multi-plate frictional lockup clutch mechanism 8 including a lockup piston 80, first and second friction plates 83, 84, etc.; and a damper device 10 connected to the turbine hub 7 and connected to the lockup clutch mechanism 8.

The front cover 3 includes a centerpiece 30 and a cover main body 33 that has a sidewall portion 34 fixed to the centerpiece 30 by welding and extending in the radial direction and an outer cylindrical portion 35 extended from the outer periphery of the sidewall portion 34 in the axial direction of the hydraulic transmission apparatus 1. A set block 36, which is coupled to a drive plate (not shown) connected to the crankshaft of the engine, not shown, is fixed to an outer peripheral portion of the sidewall portion 34 of the cover main body 33 by welding etc. The pump impeller 4 has a pump shell 40 firmly fixed to the outer cylindrical portion 35 of the front cover 3, and a plurality of pump blades 41 arranged on the inner surface of the pump shell 40. The turbine runner 5 has a turbine shell 50 and a plurality of turbine blades 51 arranged on the inner surface of the turbine shell 50. The turbine shell 50 is fitted in the turbine hub 7, and is fixed to the turbine hub 7 via a rivet. The stator 6 has a plurality of stator blades 60, and the rotation direction of the stator 6 is set to only one direction by a one-way clutch 61. The pump impeller 4 and the turbine runner 5 face each other, and the pump impeller 4, the turbine runner 5, and the stator 6 form a torus (annular flow path) in which the hydraulic oil is circulated.

Figure 2:
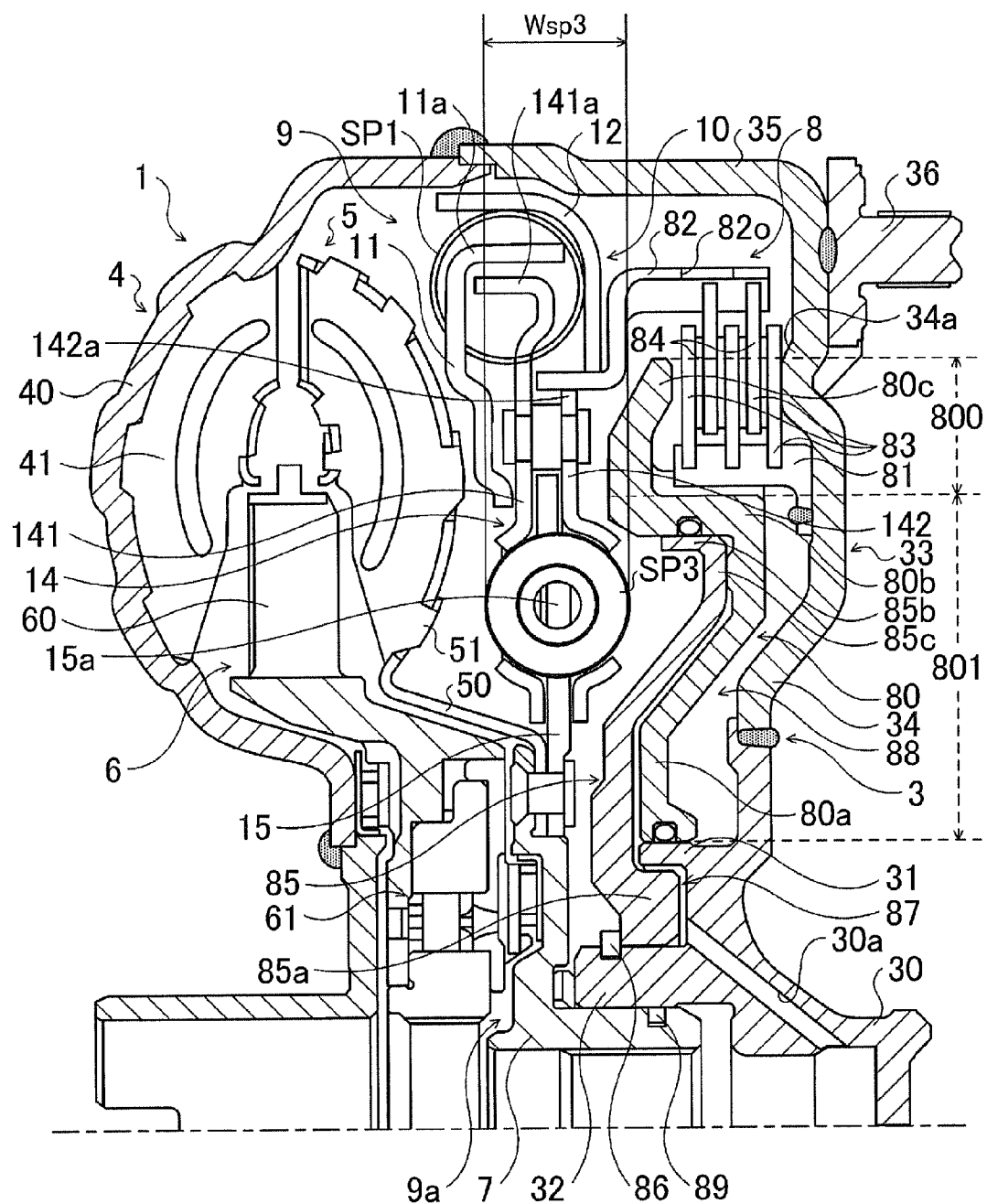
FIG. 2 is a partial sectional view showing a main part of the hydraulic transmission apparatus 1.

As shown in FIGS. 1 and 2, the damper device 10 includes: a drive member 11 as an input element that is placed on the opposite side of the lockup piston 80 from the first and second friction plates 83, 84, namely on the side where the pump impeller 4 and the turbine runner 5 are provided; a first intermediate member (first intermediate element) 12 that engages with the drive member 11 via a plurality of first springs (first elastic bodies) SP1; a second intermediate member (second intermediate element) 14 that engages with the first intermediate member 12 via a plurality of second springs (second elastic bodies) SP2; and a driven member (output element) 15 that engages with the second intermediate member 14 via a plurality of third springs (third elastic bodies) SP3. In the embodiment, the first and second springs SP1, SP2 as outer peripheral-side springs are coil springs formed of a metal material wound in a helical shape so as to have a central axis extending straight when not subjected to any load. The third springs SP3 as inner peripheral-side springs are arc springs formed of a metal material wound so as to have a central axis extending in an arc shape when not subjected to any load.

The drive member 11 has spring contact portions 11a each contacting one end of a corresponding one of the first springs SP1, and spring support portions 11b. The drive member 11 is fixed to a clutch drum 82 of the lockup clutch mechanism 8 via a rivet, and is placed in an outer peripheral-side region in a hydraulic transmission chamber 9 defined by the front cover 3 and the pump shell 40 of the pump impeller 4. The first intermediate member 12 is configured as an annular member that, together with the spring support portions 11b of the drive member 11, is capable of slidably supporting the first and second springs SP1, SP2 such that the first and second springs SP1, SP2 are (alternately) arranged on the same circumference so as to adjoin each other. In the embodiment, the first intermediate member 12 is rotatably supported around the axis of the hydraulic transmission apparatus 1 by the clutch drum 82 of the lockup clutch mechanism 8, and is placed in the outer peripheral-side region in the hydraulic transmission chamber 9. As shown in FIGS. 1 and 2, the first intermediate member 12 has pairs of spring contact portions 12a. Each of the pairs is placed between the other end of a corresponding one of the first springs SP1 and one end of the second spring SP2 adjoining this first spring SP1 and contacts both the first spring SP1 and the second spring SP2.

The second intermediate member 14 is formed by an annular first plate 141 and an annular second plate 142 that is fixed to the first plate 141 via a rivet. In the embodiment, the second intermediate member 14 is rotatably supported around the axis of the hydraulic transmission apparatus 1 by the driven member 15. The first plate 141 of the second intermediate member 14 has on its outer peripheral side spring contact portions 141a each contacting the other end of a corresponding one of the second springs SP2, and has on its inner peripheral side spring support portions that support the third springs SP3. The second plate 142 of the second intermediate member 14 has on its outer peripheral side a clutch drum support portion 142a that rotatably supports the clutch drum 82 of the lockup clutch mechanism 8, and has spring support portions that face the spring support portions of the first plate 141 and support the third springs SP3, respectively. Spring contact portions (not shown) each contacting one end of a corresponding one of the third springs SP3 are formed in the first and second plates 141, 142.

Thus, each of the first springs SP1 is placed in an outer peripheral portion of the damper device 10 so as to be located between the spring contact portion 11a of the drive member 11 and the spring contact portion 12a of the first intermediate member 12, and each of the second springs SP2 is placed in the outer peripheral portion of the damper device 10 so as to be located between the spring contact portion 12a of the first intermediate member 12 and the spring contact portion 141a of the second intermediate member 14, namely the first plate 141. Each of the third springs SP3 is placed so as to be separated from the first and second springs SP1, SP2 in the radial direction of the hydraulic transmission apparatus 1, and is located on the inner peripheral side with respect to the first and second springs SP1, SP2.

The driven member 15 is placed between the first plate 141 and the second plate 142 of the second intermediate member 14, and is fixed to the turbine hub 7. The driven member 15 has spring contact portions 15a each contacting the other end of a corresponding one of the third springs SP3. Moreover, the driven member 15 has plate support portions 15c protruding in the axial direction and rotatably supporting the inner periphery of the second plate 142 of the second intermediate member 14. Thus, the second intermediate member 14 is rotatably supported by the driven member 15, and is placed around the axis of the hydraulic transmission apparatus 1.

The lockup clutch mechanism 8 is capable of performing a lockup operation of coupling the front cover 3 as the input member to the turbine hub 7, namely the input shaft of the transmission apparatus via the damper device 10, and is capable of cancelling the lockup. As shown in FIGS. 1 and 2, the lockup clutch mechanism 8 is placed between the damper device 10 and the sidewall portion 34 of the front cover 3. The lockup clutch mechanism 8 includes: the lockup piston 80 that is supported slidably in the axial direction by the front cover 3; an annular clutch hub (first friction plate support member) 81 that is fixed to the sidewall portion 34 of the front cover 3 (cover main body 33) so as to face the lockup piston 80; the clutch drum (friction plate support member or second friction plate support member) 82 that is connected to the drive member 11 and is coupled to the input shaft of the transmission apparatus via the damper device 10; the first friction plates (separator plates) 83 that are fitted in splines formed in the outer periphery of the clutch hub 81 and are supported slidably in the axial direction by the clutch hub 81; the second friction plates (friction plates having a friction material) 84 that are fitted in splines formed in the inner periphery of the clutch drum 82 and are supported slidably in the axial direction by the clutch drum 82; and an annular flange member (oil-chamber defining member) 85 that is fixed to the centerpiece 30 of the front cover 3 so as to be located closer to the damper device 10 than the lockup piston 80 is.

The lockup piston 80 is placed on the opposite side of the first and second friction plates 83, 84 from the sidewall portion 34 of the cover main body 33 forming the front cover 3 (between the sidewall portion 34 and the damper device 10) and has: an inner peripheral portion 80a that is fitted in a first cylindrical portion (first support portion) 31 formed in the centerpiece 30 and faces the inner surface of the front cover 3 (the sidewall portion 34 of the cover main body 33 etc.); a cylindrical portion 80b that is extended from an outer peripheral portion of the inner peripheral portion 80a toward the damper device 10 and in the axial direction; and an outer peripheral portion 80c extended outward from the cylindrical portion 80b and toward the front cover 3. A portion located above a broken line in FIG. 2 and including the outer peripheral portion 80c forms a pressing portion 800 of the lockup piston 80, and a portion located below the broken line forms an oil-chamber defining portion 801 of the lockup piston 80. The inner peripheral portion 80a of the lockup piston 80 slide-contacts the outer peripheral surface of the first cylindrical portion 31 of the centerpiece 30 via a seal member such as an O-ring. As shown in the figure, the cylindrical portion 80b of the lockup piston 80 is spline-fitted to the inner peripheral portion of the clutch hub 81 fixed to the front cover 3 (cover main body 33), whereby a part of the lockup piston 80 is placed on the inner peripheral side of the clutch hub 81, and is supported slidably in the axial direction of the hydraulic transmission apparatus 1 by the front cover 3. Moreover, the outer peripheral portion 80c of the lockup piston 80 faces an approximately central portion (central portion between the outer and inner peripheries) of one first friction plate 83 located closest to the damper device 10 out of the plurality of first friction plates 83 supported by the clutch hub 81.

The clutch hub 81 is fixed to the inner surface of the sidewall portion 34 of the cover main body 33 by welding, and as shown in the figure, the clutch hub 81 and the clutch drum 82 are placed in a region located on the outer peripheral side in the front cover 3. Moreover, the sidewall portion 34 of the cover main body 33 has an annular protruding portion 34a that is formed by press molding so as to protrude in the axial direction toward the lockup piston 80, and that contacts an approximately central portion (central portion between the outer and inner peripheries) of one first friction plate 83 located closest to the front cover 3 out of the plurality of first friction plates 83 supported by the clutch hub 81. Since the protruding portion contacting one of the first and second friction plates 83, 84 is thus formed in the front cover 3 (sidewall portion 34), a so-called backing plate (end plate) can be omitted, and the number of parts can be reduced. Moreover, since a bend portion is formed in the front cover 3 (sidewall portion 34), rigidity of the sidewall portion 34 (front cover 3) can further be increased.

The flange member 85 has: a base portion (inner peripheral portion) 85a that is fitted in a second cylindrical portion (second support portion) 32 formed in the centerpiece 30 so as to protrude more toward the damper device 10 than the first cylindrical portion 31 does on the inner peripheral side of the first cylindrical portion 31; a cylindrical outer peripheral portion 85b that slide-contacts the inner peripheral surface of the cylindrical portion 80b of the lockup piston 80 via a seal member such as an O-ring to guide axial movement of the lockup piston 80; and a piston movement restricting portion 85c having an annular surface extending inward and in the radial direction (direction perpendicular to the axial direction) from the outer edge of the outer peripheral portion 85b which is located on the lockup piston 80 side. As shown in FIG. 2, the second cylindrical portion 32 of the centerpiece 30 is formed so as to overlap the end of the first cylindrical portion 31 which is located on the damper device 10 side, as viewed in the radial direction, and the base portion 85a of the flange member 85 is inserted into the overlapping portion (recessed portion) between the first cylindrical portion 31 and the second cylindrical portion 32. Thus, the first cylindrical portion 31 and the flange member 85 fitted on the second cylindrical portion 32 overlap each other as viewed in the radial direction. The flange member 85 (base portion 85a) is fixed to the centerpiece 30 (front cover 3) in the axial direction with a snap ring 86. As shown in the figure, the second cylindrical portion 32 of the centerpiece 30 is rotatably fitted on the turbine hub 7, and a seal member 89 such as an O-ring is placed therebetween.

The flange member 85 guides axial movement of the lockup piston 80, and together with the lockup piston 80 defines, on the opposite side of the lockup piston 80 from the front cover 3 (sidewall portion 34), an engagement-side oil chamber 87 to which hydraulic oil is supplied. The hydraulic oil (lockup pressure) that engages the lockup clutch mechanism 8 (that brings the lockup clutch mechanism 8 into a completely engaged state or a slipping state) is supplied from a hydraulic control apparatus (not shown), which is driven by the engine and connected to an oil pump, not shown, to the engagement-side oil chamber 87 through an oil passage formed in the input shaft of the transmission apparatus or an oil passage 30a formed in the centerpiece 30. In the embodiment, as shown in FIGS. 1 and 2, the oil passage 30a formed in the centerpiece 30 opens in the axial direction to the engagement-side oil chamber 87. Moreover, the front cover 3 and the lockup piston 80 define, on the inner peripheral side of the clutch hub 81, i.e., on the inner peripheral side of the first and second frictional plates 83, 84, a lubricant passage (oil chamber) 88 that supplies hydraulic oil into the hydraulic transmission chamber 9 defined by the front cover 3 and the pump shell 40 of the pump impeller 4, namely that supplies hydraulic oil to the first and second friction plates 83, 84, the pump impeller 4, the turbine hub 7, the damper device 10, etc. The hydraulic oil (e.g., a circulation pressure as a reduced line pressure) is supplied from the hydraulic control apparatus, not shown, into the hydraulic transmission chamber 9 through an oil passage formed in the input shaft of the transmission apparatus and an oil passage 30b (see FIG. 1) formed in the centerpiece 30. As shown in FIG. 1, an opening 810 that allows the lubricant passage 88 to communicate with the side where the first and second friction plates 83, 84 are provided, namely the hydraulic transmission chamber 9, is formed in the clutch hub 81, and an opening 82o that allows the side where the lubricant passage 88 is provided to communicate with the hydraulic transmission chamber 9 is formed in the clutch drum 82.

In such a hydraulic transmission apparatus 1 including the lockup clutch mechanism 8, the damper device 10, and the flange member 85, the clutch drum 82, the first and second friction plates 83, 84, the clutch hub 81, the lockup piston 80, and the oil-chamber defining member 85 are sequentially arranged in this order from the outer periphery of the hydraulic transmission apparatus 1 toward the inner periphery thereof so as to overlap each other as appropriate. The outer peripheral portion 80c as an outer peripheral portion of the lockup piston 80 is located closer to the outer periphery than the outer peripheral portion 85b of the flange member 85 is, and the inner peripheral portion 80a of the lockup piston 80 is located closer to the outer periphery than the base portion (inner peripheral portion) 85a of the flange member 85 is. A part of the lockup piston 80 which is located closer to the outer periphery (a part located closer to the outer periphery than the cylindrical portion 80b; in the embodiment, the back of the outer peripheral portion 80c) is placed in a region located between the first and second springs SP1, SP2 and the third spring SP3 of the damper device 10 in the radial direction and in the range of an axial width Wsp3 (see FIG. 2) of the third spring SP3 located closer to the lockup piston 80 out of the first and second springs SP1, SP2 and the third spring SP3, at least when the lockup clutch mechanism 8 is not engaged (when the lockup piston 80 is located farthest away from the front cover 3). That is, the back of the outer peripheral portion 80c of the lockup piston 80 extends perpendicularly to the central axis of the lockup piston 80 etc., and protrudes toward the damper device 10 with respect to a plane that is tangent to the third spring SP3 on the lockup piston 80 side. Thus, the lockup piston 80 and the flange member 85 are placed so as to be offset in the radial direction, and a part of the lockup piston 80 is located in the region between the first and second springs SP1, SP2 and the third spring SP3 of the damper device 10 in the radial direction, whereby the lockup piston 80, the flange member 85, and the damper device 10 can be arranged closer to each other in the axial direction. This can reduce the axial length of the multi-plate friction lockup clutch mechanism 8 and the hydraulic transmission apparatus 1.

Operation of the hydraulic transmission apparatus 1 as the starting apparatus configured as described above will be described below. In a vehicle having the hydraulic transmission apparatus 1 mounted thereon, the lockup clutch mechanism 8 is disengaged before starting. When the engine is started and is in an idle state, the hydraulic transmission apparatus 1 is in a stall state where the pump impeller 4 connected to the front cover 3 rotates at the same rotational speed as the engine and the turbine runner 5 does not rotate and stops. Hydraulic oil from the hydraulic control apparatus, not shown, is supplied into the hydraulic transmission chamber 9 of the hydraulic transmission apparatus 1 through the lubricant passage 88. As the rotational speed and the output torque of the engine are increased from the stall state, power from the engine is transmitted to the pump impeller 4 via the front cover 3, and the turbine runner 5 is rotated by the flow of the hydraulic oil according to the rotation of the pump impeller 4. Thus, the power from the engine is transmitted to the transmission apparatus of a subsequent stage via the pump impeller 4, the turbine runner 5, and the turbine hub 7. When the rotational speed difference between the pump impeller 4 and the turbine runner 5 is large, the hydraulic transmission apparatus 1 functions as a torque amplifier by the operation of the stator 6. When this rotational speed difference is small, the hydraulic transmission apparatus 1 functions as a fluid coupling. The hydraulic oil supplied into the hydraulic transmission chamber 9 flows in the hydraulic transmission chamber 9, and then is returned to an oil pan, not shown, via an oil passage 9a etc.

If the rotational speed of the engine or the input shaft of the transmission apparatus reaches a predetermined relatively low clutch engagement rotational speed, slip control is performed in which hydraulic oil is supplied to the engagement-side oil chamber 87 and the lockup pressure to the engagement-side oil chamber 87 is gradually made higher than the circulation pressure to the lubricant passage 88 so that the torque capacity of the lockup clutch mechanism 8 is gradually increased. Thus, the lockup piston 80 is moved in the axial direction toward the sidewall portion 34 of the front cover 3 to press the first and second friction plates 83, 84 against the protruding portion 34a of the sidewall portion 34, whereby the power from the engine is transmitted to the transmission apparatus in the subsequent stage also via a transmission path formed by the front cover 3, the lockup clutch mechanism 8, the damper device 10, and the turbine hub 7. At this time, the lockup clutch mechanism 8 transmits the power from the front cover 3 to the turbine hub 7 while causing slipping between the front cover 3 and the turbine hub 7, and vibrations in torque (torsional vibrations) are absorbed (dampened) by the damper device 10 coupled to the front cover 3 via the clutch hub 81.

Performing such slip control can suppress revving up of the engine to improve fuel economy of the engine, and can transmit power from the engine to the transmission apparatus. Moreover, since the lockup clutch mechanism 8 of the embodiment is a multi-plate friction clutch, the torque capacity at which the slip control is performed can be set more properly. In this case, since a sufficient amount of hydraulic oil can be supplied to the first and second friction plates 83, 84 of the lockup clutch mechanism 8 via the lubricant passage 88, the first and second friction plates 83, 84, the damper device 10, various bearings, etc. can be satisfactorily lubricated and cooled. Moreover, in the lockup clutch mechanism 8 of the embodiment, the outer peripheral portion 80c of the lockup piston 80 contacts the approximately central portion of the first friction plate 83 located closest to the damper device 10, and the protruding portion 34a formed in the sidewall portion 34 of the cover main body 33 contacts the approximately central portion of the first friction plate 83 located closest to the front cover 3. This can suppress the tilt of the first and second friction plates 83, 84 and can satisfactorily suppress uneven wear and heat generation.

Moreover, if predetermined lockup conditions are satisfied with, e.g., a vehicle speed and an accelerator opening amount (accelerator operation amount) as parameters, the lockup pressure is set so that the lockup clutch mechanism 8 is fully engaged, and the lockup piston 80 is moved further in the axial direction toward the sidewall portion 34 of the front cover 3 to press the first and second friction plates 83, 84 together, whereby the front cover 3 and the turbine hub 7 (input shaft) are coupled (locked up) by the lockup clutch mechanism 8 via the damper device 10. This allows the power from the engine to be directly and efficiently transmitted to the transmission apparatus in the subsequent stage without via the pump impeller 4 and the turbine runner 5. Even after the lockup is thus completed, variations in torque that is applied to the front cover 3 are absorbed by the damper device 10.

On the other hand, when the lockup performed by the lockup clutch mechanism 8 is cancelled, supply of the hydraulic oil (circulation pressure) to the lubricant passage 88 is continued, and the lockup pressure to the engagement-side oil chamber 87 is gradually reduced to stop supply of the hydraulic oil. Thus, the lockup piston 80 is moved in the axial direction away from the front cover 3 (toward the damper device 10), and is stopped when the back surface of the lockup piston 80 contacts the piston movement restricting portion 85c of the flange member 85. At this time, since a sufficient amount of hydraulic oil is supplied to the first and second friction plates 83, 84 via the lubricant passage 88, the first and second friction plates 83, 84 that have been pressed together can be quickly separated from each other in the lockup clutch mechanism 8 of the embodiment.

As described above, the lockup clutch mechanism 8 included in the hydraulic transmission apparatus 1 of the present embodiment includes: the lockup piston 80 that is capable of moving in the axial direction toward the front cover 3 to press the first and second friction plates 83, 84; and the flange member 85 that together with the lockup piston 80 defines, on the opposite side of the lockup piston 80 from the front cover 3, the engagement-side oil chamber 87 to which the hydraulic oil is supplied. The lockup piston 80 is axially movably supported by the front cover 3, and the flange member 85 is fitted in the front cover 3 and is fixed to the front cover 3 in the axial direction with the snap ring 86. Since both the lockup piston 80 and the flange member 85 are thus supported by the front cover 3, these three members can be arranged closer to each other in the axial direction, whereby the axial length of the lockup clutch mechanism 8 and the hydraulic transmission apparatus 1 can be reduced. Since the hydraulic transmission apparatus 1 has the first and second springs SP1, SP2 as the outer peripheral-side springs, the third springs SP3 as the inner peripheral-side springs, and the multi-plate lockup clutch mechanism 8, torque vibrations can be effectively absorbed. Moreover, for example, increasing a slip region in the lockup clutch mechanism 8 allows torque variations to be more effectively absorbed, and allows the axial length to be reduced.

Moreover, in the above embodiment, the lockup piston 80 of the lockup clutch mechanism 8 is placed on the opposite side (the damper device 10 side) of the first and second friction plates 83, 84 from the sidewall portion 34 of the front cover 3, and the damper device 10 is placed on the opposite side (the side where the pump impeller 4 and the turbine runner 5 are provided) of the lockup piston 80 from the first and second friction plates 83, 84. The outer peripheral portion 80c as the outer peripheral portion of the lockup piston 80 is located closer to the outer periphery than the outer peripheral portion 85b of the flange member 85 is. At least when the lockup clutch mechanism 8 is not engaged, a part of the lockup piston 80 is located in the region located between the first and second springs SP 1, SP2 and the third spring SP3 of the damper device 10 in the radial direction and in the range of the axial width Wsp3 of the third spring SP3 located closer to the lockup piston 80 out of the first and second springs SP1, SP2 and the third spring SP3. Since the lockup piston 80 and the flange member 85 are thus placed so as to be offset in the radial direction, and a part of the lockup piston 80 is located in the region between the first and second springs SP1, SP2 and the third spring SP3 of the damper device 10 in the radial direction, the lockup piston 80, the flange member 85, and the damper device 10 can be arranged closer to each other in the axial direction, whereby the axial length of the lockup clutch mechanism 8 and the hydraulic transmission apparatus 1 can be reduced.

In the above embodiment, the front cover 3 includes the first cylindrical portion 31 slidably supporting the lockup piston 80, and the second cylindrical portion 32 which is formed at a position closer to the inner periphery than the first cylindrical portion 31 is and on which the flange member 85 is fitted. Thus, the front cover 3, the lockup piston 80, and the flange member 85 can be arranged closer to each other in the axial direction, whereby the axial length of the lockup clutch mechanism 8 and the hydraulic transmission apparatus 1 can further be reduced. In the above embodiment, if the first cylindrical portion 31 and the flange member 85 fitted on the second cylindrical portion 32 are formed so as to overlap each other as viewed in the radial direction, the axial length of the lockup clutch mechanism 8 and the hydraulic transmission apparatus 1 can further be reduced.

In the above embodiment, the front cover 3 and the lockup piston 80 define, on the inner peripheral side of the first and second friction plates 83, 84, the lubricant passage 88 that supplies the hydraulic oil to the first and second friction plates 83, 84. Thus, if a sufficient amount of hydraulic oil is supplied to the first and second friction plates 83, 84 through the lubricant passage 88 when the lockup clutch mechanism 8 is disengaged, the first and second friction plates 83, 84 that have been pressed together can be quickly separated from each other. Thus, a return spring can be omitted, and the axial length of the lockup clutch mechanism 8 and the hydraulic transmission apparatus 1 can be reduced.

In the above embodiment, the flange member 85 includes the piston movement restricting portion 85c that contacts the lockup piston 80 to restrict movement of the lockup piston 80 in a direction away from the first and second friction plates 83, 84. This eliminates the need to separately use a member, such as a snap ring, which restricts movement of the lockup piston 80 in the direction away from the first and second friction plates 83, 84, whereby the axial length of the lockup clutch mechanism 8 and the hydraulic transmission apparatus 1 can further be reduced.

Moreover, as in the above embodiment, if the oil passage 30a that opens in the axial direction to the engagement-side oil chamber 87 is formed in the centerpiece 30 of the front cover 3, the axial length of the engagement-side oil chamber 87 can be reduced, whereby the axial length of the lockup clutch mechanism 8 and the hydraulic transmission apparatus 1 can further be reduced. Furthermore, in the above embodiment, the front cover 3 has the protruding portion 34a that is formed to protrude in the axial direction toward the lockup piston 80, and that contacts one of the first and second friction plates 83, 84 (in the above embodiment, the first friction plate 83 located closest to the front cover 3). Thus, a so-called backing plate (end plate) can be omitted, whereby the axial length of the lockup clutch mechanism 8 and the hydraulic transmission apparatus 1 can further be reduced.

In the hydraulic transmission apparatus 1 of the above embodiment, a sufficient amount of hydraulic oil can be supplied to the hydraulic transmission chamber 9, i.e., the pump impeller 4 and the turbine runner 5, via the lubricant passage 88 when torque by the pump impeller 4 and the turbine runner 5 is transferred. Thus, when the lockup clutch mechanism 8 is engaged (during slip control or lockup), a sufficient amount of hydraulic oil is supplied to the first and second friction plates 83, 84 via the lubricant passage 88, whereby the first and second friction plates 83, 84 can be efficiently cooled.

Figure 3:
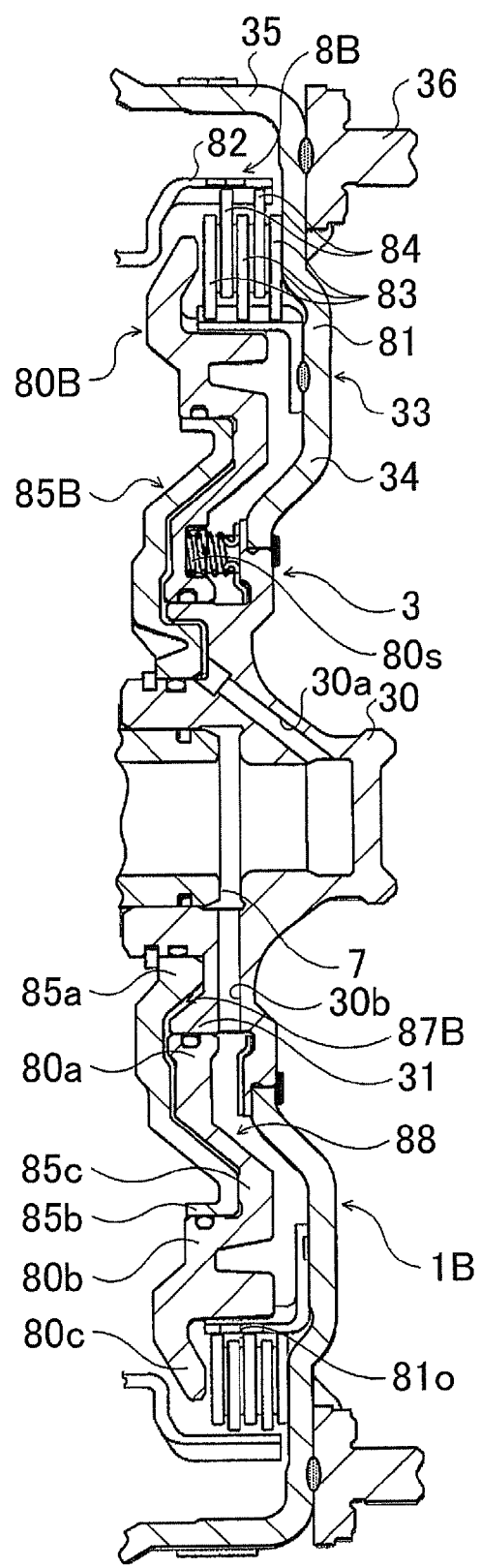
FIG. 3 is an enlarged partial sectional view showing a main part of a hydraulic transmission apparatus 1B according to a modification.

As in a hydraulic transmission apparatus 1B shown in FIG. 3, the inner diameter of a cylindrical portion 80b of a lockup piston 80B may be reduced (by locating the inner peripheral surface of the cylindrical portion 80b closer to the apparatus central axis) to reduce the capacity of an engagement-side oil chamber 87B defined by the lockup piston 80B and a flange member 85B. This can improve response of a lockup clutch mechanism 8B to the lockup pressure. In this case, as shown in FIG. 3, a return spring 80s may be placed between the lockup piston 80B and the front cover 3. A damper device 10 may be configured so that a driven member is placed on the outer peripheral side in a hydraulic transmission chamber defined by a front cover and a pump shell of a pump impeller, and that a drive member is placed on the inner peripheral side in the hydraulic transmission chamber. The damper device 10 may be configured as a so-called parallel damper device. Moreover, the damper device 10 described above may be applied to a fluid coupling that does not include any stator that adjusts the flow of working fluid from a turbine runner toward the pump impeller.

Correspondence between the primary elements of the embodiment and the primary elements of the invention described in "SUMMARY OF THE INVENTION" will be described below. The hydraulic transmission apparatus 1 including the lockup clutch mechanism 8 and the damper device 10 corresponds to the "starting apparatus." In the above embodiment, the lockup clutch mechanism 8 that performs a lockup operation of directly transferring the torque input to the front cover 3 as the input member to the input shaft of the transmission apparatus and cancels the lockup corresponds to the "clutch." The first friction plate 83 that is fitted in the clutch hub 81 fixed to the front cover 3 corresponds to the "first friction plate," and the second friction plate 84 that is fitted in the clutch drum 82 coupled to the input shaft of the transmission apparatus via the damper device 10 corresponds to the "second friction plate." The lockup piston 80 capable of moving in the axial direction toward the front cover 3 to press the first and second friction plates 83, 84 corresponds to the "piston." The flange member 85 that together with the lockup piston 80 defines, on the opposite side of the lockup piston 80 from the front cover 3, the engagement-side oil chamber 87 to which the hydraulic oil is supplied corresponds to the "oil-chamber defining member." The first cylindrical portion 31 of the centerpiece 30 forming the front cover 3 corresponds to the "first support portion," and the second cylindrical portion 32 of the centerpiece 30 forming the front cover 3 corresponds to the "second support portion." The lubricant passage 88 that is defined on the inner peripheral side of the first and second friction plates 83, 84 by the front cover 3 and the lockup piston 80 to supply hydraulic oil to the first and second friction plates 83, 84 corresponds to the "lubricant passage." The piston movement restricting portion 85c of the flange member 85 corresponds to the "piston movement restricting portion," and the oil passage 30a that opens in the axial direction to the engagement-side oil chamber 87 corresponds to the "oil passage." The protruding portion 34a that that is formed in the sidewall portion 34 of the cover main body 33 of the front cover 3 so as to protrude in the axial direction toward the lockup piston 80 and to contact the first friction plate 83 corresponds to the "protruding portion." The correspondence between the primary elements of the embodiment and the primary elements of the invention described in "SUMMARY OF THE INVENTION" is shown by way of example to specifically describe the mode in which the embodiment carries out the invention described in "SUMMARY OF THE INVENTION." Thus, this correspondence is not intended to limit the elements of the invention described in "SUMMARY OF THE INVENTION." That is, the embodiment is merely a specific example of the invention described in "SUMMARY OF THE INVENTION," and the invention described in "SUMMARY OF THE INVENTION" should be construed based on the description therein.

Although the mode for carrying out the invention is described above based on the embodiment, it should be understood that the present invention is not limited in any way to the above embodiment, and various modifications can be made without departing from the spirit and scope of the present invention.

The present invention can be used in the field of manufacturing starting apparatuses, etc.

The invention claimed is:

1. A starting apparatus comprising:
    a clutch configured to transmit power between an input member and an input shaft of a transmission apparatus and configured to disrupt a power transmission between the input member and the input shaft; and
    a damper having an outer peripheral-side spring and an inner peripheral-side spring, which are both disposed so as to provide a dampening between the clutch and the input shaft of the transmission apparatus, wherein
    the clutch includes
        a first friction plate that is fitted in a clutch hub fixed to the input member,
        a second friction plate that is fitted in a clutch drum coupled to the input shaft of the transmission apparatus,
        a piston that is placed on an opposite side of the first and second friction plates from the input member and is configured to move in an axial direction of the starting apparatus toward the input member to press the first and second friction plates against each other, and an oil-chamber defining member that, together with the piston, defines an engagement-side oil chamber to which hydraulic oil is supplied, the damper is placed on an opposite side of the piston from the first and second friction plates, a pressing portion of the piston is located closer to an outer periphery of the starting apparatus than an outer peripheral portion of the oil-chamber defining member is, and the pressing portion of the piston is placed in a region located between the outer peripheral-side spring and the inner peripheral-side spring in a radial direction of the starting apparatus and in a range of an axial width of one of the outer peripheral-side spring and the inner peripheral-side spring.

2. The starting apparatus according to claim 1, wherein the input member includes a first support portion that slidably supports an inner peripheral portion of the piston, and a second support portion which is formed closer to an inner periphery of the starting apparatus than the first support portion is, and on which an inner peripheral portion of the oil-chamber defining member that is fixed in the axial direction is fitted.

3. The starting apparatus according to claim 2, wherein the first support portion and the oil-chamber defining member fitted on the second support portion overlap each other as viewed in the radial direction.

4. The starting apparatus according to claim 1, wherein the input member and the piston define, on an inner peripheral side of the first and second friction plates, a lubricant passage that supplies the hydraulic oil to the first and second friction plates.

5. The starting apparatus according claim 1, wherein the oil-chamber defining member has a piston movement restricting portion that contacts the piston to restrict movement of the piston in a direction away from the first and second friction plates.

6. The starting apparatus according to claim 1, wherein an oil passage that opens in the axial direction to the engagement-side oil chamber is formed in the input member.

7. The starting apparatus according to claim 1, wherein the input member has a protruding portion that is formed so as to protrude in the axial direction toward the piston, and that contacts one of the first and second friction plates.

8. The starting apparatus according to claim 1, wherein further comprising: a pump impeller; and a turbine runner, wherein the input member is a front cover that is bonded to a pump shell of the pump impeller, and that together with the pump shell forms a hydraulic transmission chamber.

* * * * *